United States Patent [19]
Sheldon et al.

[11] Patent Number: 5,765,143
[45] Date of Patent: Jun. 9, 1998

[54] METHOD AND SYSTEM FOR INVENTORY MANAGEMENT

[75] Inventors: David E. Sheldon, Danville; James Leach, San Ramon; Vladimir Pisarsky, Mountain View, all of Calif.

[73] Assignee: Triad Systems Corporation, Livermore, Calif.

[21] Appl. No.: 402,025

[22] Filed: Mar. 10, 1995

Related U.S. Application Data

[63] Continuation-in-part of Ser. No. 396,457, Feb. 28, 1995, abandoned.

[51] Int. Cl.⁶ .................................................. G06F 17/60
[52] U.S. Cl. ............................ 705/28; 705/10; 705/22
[58] Field of Search .......................... 364/401 R, 402, 364/403; 395/210, 228; 705/10, 16, 22, 28

[56] References Cited

U.S. PATENT DOCUMENTS

| | | | |
|---|---|---|---|
| 4,972,504 | 11/1990 | Daniel, Jr. et al. | 455/2 |
| 5,128,861 | 7/1992 | Kagami et al. | 705/10 |
| 5,168,445 | 12/1992 | Kawashima et al. | 364/403 |
| 5,406,475 | 4/1995 | Kouchi et al. | 395/208 |
| 5,537,313 | 7/1996 | Pirelli | 395/228 |
| 5,615,109 | 3/1997 | Eder | 705/8 |

OTHER PUBLICATIONS

L.L. George, "A Note on Estimation of a Hidden Service Distribution of an M/G/Infinity Service System," ASOC Random Samples, June 1994 (two pages).

L.L. George, "Estimate Reliability Functions Without Life Data," Reliability Review, vol. 13, pp. 21–26 (1993).

An eight page brochure entitled "MarketPace Service & Automotive POS Data" by Triad Systems Corporation (which includes a one-page cover letter dated Mar. 1, 1994 by Mr. David Sheldon), published on or after Mar. 7, 1994.

A two page brochure by Systems Exchange Seminars entitled "Spares Management & Modeling" (Jan. 1995).

A letter dated Jan. 5, 1995 by Systems Exchange Seminars.

L.L. George, "A Note on Estimation of a Hidden Service Distribution of a M/G/Infinity Service System," Random Samples, (Jun. 1994) (first page only is attached).

L.L. George, "Estimate Reliability Functions Without Life Data," Reliability Review, vol. 13, pp. 21–25 (1993) (first page only is attached).

A brouche entitled "Stockaid–Apple" Apple Service Provider's Stock Level Computer Program User's Guide, published Nov. 1990 by Apple Computer, Inc. (22 pages).

*Primary Examiner*—Emanuel T. Voeltz
*Assistant Examiner*—Barton L. Bainbridge
*Attorney, Agent, or Firm*—Limbach & Limbach L.L.P.

[57] ABSTRACT

A computer system and computer-implemented method for controlling inventory of vendors at one level of a part distribution chain. The system includes a computer programmed with software for generating order data in response to reference data indicative of sales, inventory, demographics, and/or market characteristics of or pertaining to at least two vendors at the same distribution level. The order data is indicative of one or more of a recommended inventory increase transaction (such as a reorder by a vendor of a sold part); an inventory reduction transaction (such as a return of one or more parts in stock at the vendor); and a recommended stocking level of one or more parts by the vendor. When the computer is operated by personnel of a first vendor, it receives reference data concerning at least one other vendor at the same distribution level (in addition to processing reference data concerning the first vendor. When the computer is a host computer, it receives reference data from two or more vendors at the same distribution level. Preferably, the computer which generates the order data is programmed to generate the order data by processing forecast data which is generated by processing the reference data. To generate the forecast data, the computer preferably implements a point-of-sale based method or an actuarial method to determine a forecast of sales of a part by a vendor in a selected time period.

29 Claims, 1 Drawing Sheet

METHOD AND SYSTEM FOR INVENTORY MANAGEMENT

CROSS-REFERENCE TO PRIOR APPLICATION

This is a continuation-in-part application, whose parent is the U.S. patent application Ser. No. 08/396,453 now abandoned filed on Feb. 28, 1995, entitled "METHOD AND SYSTEM FOR INVENTORY MANAGEMENT," which names four co-inventors (including the three inventors named in the present application).

FIELD OF THE INVENTION

The invention pertains to computer systems and computer-implemented methods for managing inventories, such as inventories of aftermarket automotive parts. In accordance with the invention, a programmed computer generates order data (e.g., indicating whether to reorder a part) in response to reference data (sales, inventory, and/or market data) concerning vendors at the same level of a part distribution chain (i.e., at a single part distribution level). The computer can be operated by personnel of one vendor and receive reference data concerning at least one other vendor at the same distribution level, or can be a host computer which receives reference data concerning two or more vendors at the same distribution level.

BACKGROUND OF THE INVENTION

The distribution of aftermarket automotive parts follows a normal flow from manufacturer to warehouse/distributors to jobber stores and then to service dealers or end-user customers. The present invention pertains to computer-implemented management of vendors' inventories of products (such as automotive parts). In this specification, the term "part" denotes any product bought, sold, leased, or the like, by a vendor.

The efficiency of automotive part distribution flow is critical because of low profit margins in the distribution chain and because of the requirement to have the right part in the right place at the right time. Each vendor in the chain faces a complex inventory control problem: which parts to stock, how many of each part to stock, and whether (and if so, when) to reorder each part that has been sold. The desire to minimize the amount of money tied up in inventory must be balanced against providing good service (in the form of a high "fill rate") to customers at the next lower level in the chain.

A warehouse/distributor of automotive parts will typically stock 80,000 part numbers but may stock as many as 125,000 or more. For economic reasons, a jobber store must select only about 25,000 of those to carry in its inventory, and it must rely on the warehouse for the others. A service dealer may carry only a few (e.g., 500 to 7000) fast-moving parts and be almost totally reliant on the jobber for the rest.

Once the distributor has decided to carry a part, it will often just be in a quantity of one. This part will frequently be a "slow-mover" (in the automotive part business, about 50% of the inventory investment dollars support 80% of the part numbers which represent only about 20% of the movement).

Vendors are faced with the difficult problem of selecting the right subset of slow-moving parts (e.g., those with sales of two or less per year) to stock out of the many possible parts to stock. Typically, automotive part vendors wait for two years with no sales before replacing a part number with a different item. The selection of the new item is considered a "guessing game" by vendors, who refer to rankings of sales activity from their suppliers and "buyer's guides" that identify the vehicle applications of each part, while considering their experience and knowledge of the local market and their customers. The present invention automates the process of selecting which part numbers to stock, not only in the described context but also in other commercial contexts.

A slow moving part may be sold only once every six months or even twelve months. Thus, when such a part is sold, it would be desirable for the vendor to know if it should immediately be reordered or if another part number should be ordered instead. Until the present invention, it was not known how to implement a computer system for performing this function for a vendor in automated fashion.

It would also be desirable for the vendor to know optimal stocking levels of each part in its inventory, and whether parts should be added to or deleted from its inventory. Accordingly, computer implemented inventory management systems and methods have been proposed for providing information of this type to vendors.

Figure 1:
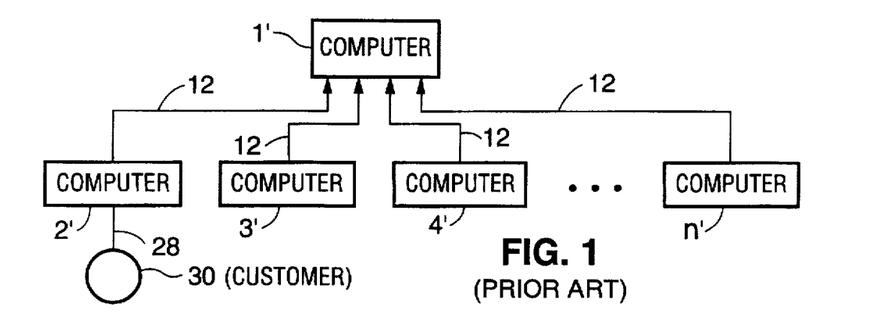
FIG. 1 is a block diagram of a conventional inventory management system, consisting of a network of programmed computers.

FIG. 1 is a block diagram of a conventional inventory management system, consisting of a network of programmed computers $1'$, $2'$, $3'$, $4'$, . . . , $n'$ (where "n" is a number greater than two). Each of computers $2'$, $3'$, $4'$, . . . , $n'$ is installed at a vendor (e.g., a retail store) at a first "vertical" level of a part distribution chain, and computer $1'$ is installed at the facility of a manufacturer or distributor at a higher level of the part distribution chain (the higher level being vertically higher than the first level in the sense that vendors at the first level purchase parts from business entities at the higher level). In response to a sale of a part (to customer 30) by the store at which computer $2'$ is installed, computer $2'$ generates purchase data 12 indicative of a reorder of the sold part. Programmed computer $1'$ receives this purchase data 12 (and similar purchase data 12 from computers $3'$, $4'$, . . . , $n'$ connected along the network) either as a result of user input, or by polling the status of computers $2'$, $3'$, . . . , $n'$. In response to data 12, computer $1'$ triggers the sale of each reordered part to each relevant store. Computer $1'$ is also programmed to aggregate the purchase data from all of computers $2'$ through $n'$, and to process the aggregated purchase data to generate suggestion data. The suggestion data is indicative of suggestions (to the stores at which computers $2'$ through $n'$ are installed) of new parts for the stores to stock. Each of the computers installed at one distribution level (e.g., computers $2'$ through $n'$) operates independently of the others installed at the same level and no one of them receives data directly from another one of them.

Copending U.S. patent application Ser. No. 08/300,405, filed Sep. 2, 1994 (assigned to the assignee of the present application), describes another computer system for distributing parts. This system includes a processor installed at a warehouse (or other place of business) which is programmed to poll other processors at distribution levels downstream from its own distribution level (e.g., processors in retail stores which purchase from the warehouse). The warehouse processor is also programmed to reorder a part selectively in response to the polled (or otherwise received) inventory data indicating that the part (or a minimum acceptable inventory of the part) is not currently in stock. An alternative embodiment is mentioned in which the warehouse processor is programmed to poll other processors at its own distribution level (e.g., processors in other warehouses), typically in addition to polling processors at downstream distribution levels. The specification of application Ser. No. 08/300,405 suggests that a database of vehicle population in a part distributor's trading area can be helpful to the distributor in determining when to reorder a part, and that services such as the "MarketPace™" product available from Triad Systems Corporation (the assignee of the present application) can provide movement information in a whole trading area. However, the referenced specification does not describe the invention of the present application.

SUMMARY OF THE INVENTION

The inventory control system of the invention includes a computer programmed with software for generating order data in response to reference data. The reference data is indicative of sales, inventory, demographics (such as vehicle population of potential customers), and/or market characteristics of at least two vendors at one level of a part distribution chain. In preferred embodiments, the reference data consists of sales, inventory, and market data generated by and received from at least two appropriately programmed vendor computers, each operated by personnel of a different one of the vendors.

The order data is indicative of one or more of a recommended inventory increase transaction (such as a reorder by the vendor of a sold part, or an order of one or more new parts); an inventory reduction transaction (such as a return of one or more parts already in stock at the vendor); and a recommended stocking level of one or more parts by the vendor.

Typically, the order data is generated to maximize a criterion (such as gross margin return on investment) subject to constraints such as available inventory investment, minimum service levels, or limitations on inventory returns.

In some embodiments, the order data generation software generates the order data in response to a sale of a part (or each transmission of reference data from a vendor-operated computer). Alternatively, it generates the order data at a predetermined time or once each predetermined time period, or in response to a user command. The computer which generates the order data can be operated by personnel of one vendor (in which case it receives reference data concerning at least one other vendor at the same distribution level), or it can be a host computer which receives reference data from two or more vendors at the same distribution level.

Preferably, the computer which generates the order data is programmed to generate the order data by processing forecast data, in turn generated by processing the reference data. The forecast data can be generated in response to each sale of a part (or each transmission of reference data from a vendor-operated computer), at a predetermined time or once each predetermined time period, or in response to a user command. To generate the forecast data, the computer preferably implements one of the following forecasting methods: (1) a point-of-sale based method which determines a forecast of sales of a part by a particular store (denoted as "store A" for convenience) in a particular time period (denoted as "time P") in accordance with the relation F=W×D×T, where F is the forecasted number of sales of the part (in time P) by store A, W is a weighted average of relative store sales of the part (by a population of stores which stock the part, which may but need not include store A), D is the total demand potential of all parts (in the same user-defined category as the part) for store A, and T is a trend factor (derived, for example, from data indicative of sales experience of a population of stores which stock the part, or of manufacturers or vendors at a higher level of distribution of the part); (2) an actuarial method which determines a forecast of sales of a part by a particular store (denoted as "store A") in a particular time period (denoted as "time P"), preferably in accordance with the relation $$F = \sum_{a=1}^{N} V_a \times R_a \times S,$$

where F is the forecasted number of sales of the part during time P by store A, $V_a$ is the vehicle population of age "a" fit by the part in the time period P of the forecast in store A's market area, $R_a$ is the failure rate per period P per vehicle of age "a" for the part (experienced by a population of stores that stock the part, possibly but not necessarily including store A), N is the age of the oldest vehicle that can use the part that exists in period P, and S is the estimate of relative market share during period P of store A in its market area for a product group including the part; and (3) a weighted average of the forecasts produced by methods (1) and (2).

In some preferred embodiments, the system of the invention includes two or more computers. Each computer is operated by personnel of a vendor, and all the vendors are at the same distribution level. The computers are connected along a network and receive reference data from each other over the network. Each computer is programmed with the inventive order data generation software (and preferably also the inventive forecasting software).

In other preferred embodiments, the system of includes two or more computers (each operated by personnel of a vendor, with all the vendors at the same distribution level) and also a host computer. The vendor computers and the host computer are connected along a network, and the host computer receives reference data from the vendor computers over the network. The host computer is programmed with the order data generation software (and preferably also the forecasting software) of the invention. Alternatively, the host computer is programmed with the forecasting software and the vendor computers are programmed with the order data generation software.

The method of the invention includes the steps of providing reference data (indicative of two or more vendors at the same distribution level) to a computer, and operating the computer to execute software which generates order data in response to reference data. The programmed computer can be a host computer which receives the reference data from other computers, each operated by personnel of a vendor (all the vendors being at the same distribution level) Or, the programmed computer can be operated by personnel of a first vendor, in which case some of the reference data is generated by that computer and the rest of the reference data is received from one or more other computers, each such other computer operated by personnel of a different vendor at the same distribution level as the first vendor. Preferably, the order data is generated by the two stage process of generating forecast data from the reference data, and then generating the order data from the reference data. The forecast data is preferably generated by implementing a point-of-sale based forecasting method, an actuarial forecasting method, or by determining a weighted average of results of both forecasting methods.

DESCRIPTION OF THE PREFERRED EMBODIMENTS

Throughout the description, "data" denotes a signal encoded with information. For example, "sale data" is used to denote a signal indicative of sale of a part (e.g., the date and quantity of sale of an identified part).

A preferred embodiment of the inventive system will be described with reference to FIG. 2. The system of FIG. 2 includes programmed computers 2, 3, 4, . . . , n (where "n" is a number greater than two) connected along (i.e., interfaced with) computer communication network 22, and also a programmed computer 1 (connected to computer 2). Each of computers 2, 3, 4, . . . , n is operated by personnel of a vendor of parts (e.g., a retail store), where the vendor operates at a first "vertical" level of a part distribution chain. It is contemplated that two, three, or more than three computers are interfaced with network 22. Computer 1 is operated by personnel of a vendor of parts (e.g., a manufacturer or distributor) at a second level of the part distribution chain (the second level being vertically higher than the first level in the sense that vendors at the first level purchase parts from business entities at the second level).

In this specification, the term "store" is sometimes used to indicate a vendor of parts.

Also in this specification, including in the claims, the expression "vendor computer" is used to denote a computer operated by personnel of a vendor (with "first vendor computer" denoting a computer operated by personnel of a "first vendor," "second vendor computer" denoting a computer operated by personnel of a "second vendor," and so on). We contemplate that a vendor computer will typically be installed at a facility of the vendor whose personnel operate the vendor computer.

Computers 2 through n are connected along computer communication network 22 so that each one of them can receive data over network 22 directly from each other one of them. Network 22 permits bidirectional data transmission (via modems or the like) between pairs of computers 2, 3, 4, . . . n which are interfaced with the network.

Figure 2:
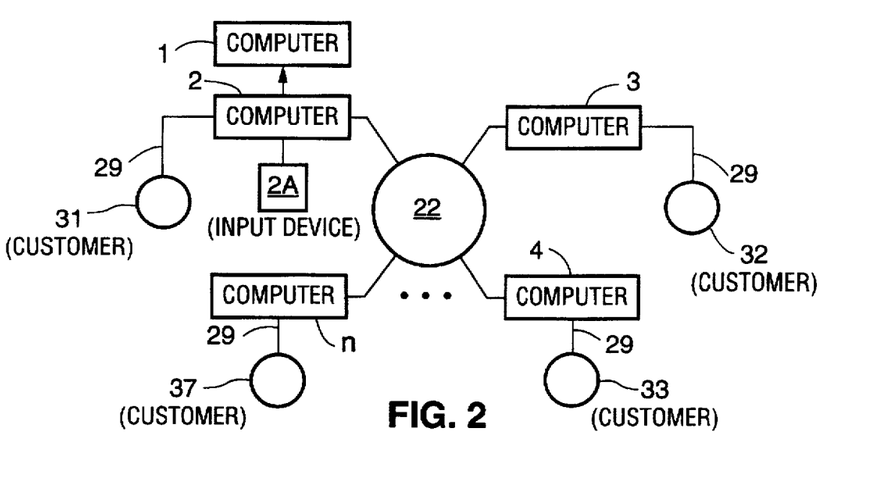
FIG. 2 is a block diagram of a preferred embodiment of the inventive system including a network of computers, operated by personnel of businesses at the same level of a product distribution chain. Each of these computers is programmed in accordance with the invention.

It should be understood that although FIG. 2 identifies elements 1, 2, 3, 4, . . . n as "computers," each of these elements is typically a computer system including a programmed CPU, a memory (e.g., for storing inventory status data that identify parts in stock), an input device, a display, and a modem connected to a telephone line. FIG. 2 shows a separate input device 2A connected to element 2, but it is contemplated that each of elements 1, 2, 3, 4, . . . , n includes an input device (as well as a memory and the other components enumerated above).

In response to each sale 29 of a part (to a customer 31) by computer 2's store (the store whose personnel operate computer 2), computer 2 executes software for generating order data. Similarly, in response to each sale 29 of a part by computer 3's (or 4's or n's) store to a customer 32 (or 33 or 37), computer 3 (or 4 or n) executes the same software for generating order data.

The order data generation software which programs each of computers 2, 3, 4, . . . , n generates order data in response to sales data, inventory data, and/or market data received over network 22 from the others of computers 2, 3, 4, . . . , n (and in response to sales data, inventory data, and/or market data stored internally in the computer concerning sales, inventory, and/or market status of the store whose personnel operate the computer). For convenience, the expression "reference data" will be employed to denote the sales data, inventory data, demographics data (such as vehicle population data), and/or market data processed during generation of order data in accordance with the invention.

In alternative embodiments, the order data generation software is executed, not in response to a sale of a part, but instead at a predetermined time or once each predetermined time period, or in response to a user command (for example a command supplied from input device 2A to computer 2 in response to user manipulation of the input device).

The order data can be indicative of one or more of: a reorder of a sold part or an order of one or more new parts (or another inventory increase transaction), a return of one or more parts already in stock at the relevant store (or another inventory reduction transaction), and a recommended stocking level for one or more parts.

Computer 1 is programmed to receive and process a transaction signal (determined by order data indicative of an inventory increase transaction or inventory reduction transaction) from each of computers 2, 3, 4, . . . , n connected along network 22, either as a result of user input or as a result of computer 1's polling of computers 2, 3, . . . , n. In response to each such transaction signal, computer 1 commands, triggers, or otherwise accomplishes the sale of each ordered or reordered part to (and the return of each specified part from) each relevant store.

Alternatively, in response to order data generated by one of computers 2, 3, . . . , n, the computer (2, 3, . . . or n) simply notifies an operator that it is now time to generate a manual purchase order or phone order from a manufacturer or distributor (or to return one or more parts to the manufacturer or distributor).

In preferred embodiments of the invention, the described order data generation software (with which each of computers 2, 3, . . . , n is programmed) forecasts the demand potential for each available part (preferably by implementing one of the methods described below), and processes the forecast data (resulting from such forecasting) to generate the order data.

Sales to customers by the stores (whose computers are connected to network 22) can be, and generally are, different in quantity and timing from the purchases (determined by the order data) made by the same stores from the manufacturers or distributors. The differences result from timely response by the order data generation software to changing market conditions and consumer buying patterns (indicated by the reference data).

Figure 3:
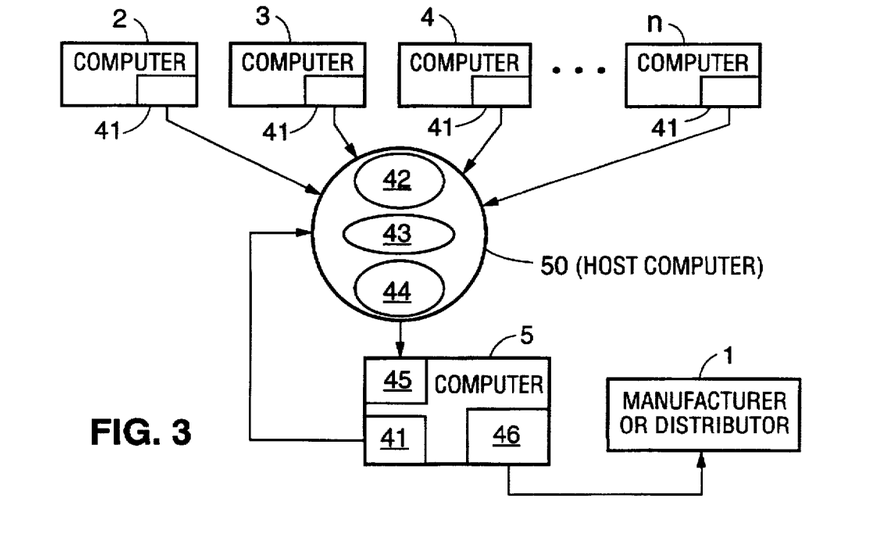
FIG. 3 is a block diagram of another preferred embodiment of the inventive system, including a network of computers operated by personnel of businesses at the same level of a product distribution chain, and a host computer. All the computers interfaced with the network are programmed in accordance with the invention.

FIG. 3 is a block diagram of another preferred embodiment of the inventive system, including a network comprising programmed computers 2, 3, 4, 5, . . . , and n (where "n" is a number greater than two), and programmed computer 50. Each of computers 2, 3, 4, 5, . . . , and n is operated by personnel of a retail store at a first "vertical" level of a part distribution chain (in the sense described above with reference to FIG. 2). Computer 50 is a host computer which generates "order data" in accordance with the invention in response to "reference data" (of the type described above with reference to FIG. 2) received from computers 2, 3, 4, 5, . . . , n.

Although FIG. 3 identifies elements 1, 2, 3, 4, ..., n, and 50 as "computers," it should be appreciated that each of these elements is typically a computer system including a programmed CPU, a memory (e.g., for storing inventory status data that identify parts in stock), an input device, a display, and a modem connected to a telephone line.

Each of computers 2, 3, 4, 5, ..., n, and computer 50 is connected along (interfaced with) a computer communication network in the sense that each of them can send data directly to or receive data directly from host computer 50. It is contemplated that the network includes two, three, or more than three computers in addition to host computer 50 (so that n=1, n=2, or n>2). The network permits bidirectional data transmission (via modems or the like) between computer 5 each of computers 2, 3, 4, 5, ..., n interfaced with the network.

Each of computers 2, 3, 4, 5, ..., and n is programmed with software 41, software 45, and software 46. When executing software 41, each computer organizes reference data (sales data, inventory data, and/or market data of the type described with reference to FIG. 2) and sends the reference data to host computer 50. When executing software 45, each of computers 2, 3, 4, 5, ..., n receives order data (of the type described above with reference to FIG. 2) from host computer 50. When executing software 46, each of computers 2, 3, 4, 5, ..., n generates a transaction signal (determined by order data from computer 50 indicative of an inventory increase transaction or inventory reduction transaction) and sends such transaction signal to computer 1. In response to each such transaction signal, computer 1 commands, triggers, or otherwise accomplishes the sale of each ordered or reordered part to (and the return of each specified part from) to the relevant store.

Host computer 50 is programmed with software 42, 43, and 44. When executing software 42, computer 50 receives reference data from one or more of computers 2, 3, 4, 5, ..., n. When executing software 43, computer 50 generates forecasts using the received reference data from computers 2, 3, 4, ..., n (and optionally also additional reference data stored in computer 50). When executing software 44, computer 50 processes the forecast data to determine order data (for each of computers 2, 3, 4, 5, ... n) indicative of one or more of: a recommended reorder of a sold part or a recommended order of one or more new parts (or another inventory increase transaction), a recommended return of one or more parts already in stock at the relevant store (or another inventory reduction transaction), and a recommended stocking level for one or more parts. Also while executing software 44, computer 50 addresses relevant portions of the order data to relevant ones of computers 2, 3, 4, 5, ..., n (on the network) and sends the order data to each addressee computer.

In preferred embodiments, in response to order data (indicative of an inventory increase transaction or inventory reduction transaction), each addressee computer's software 46 generates a transaction signal and sends the transaction signal to computer 1. In response to each such transaction signal, computer 1 commands, triggers, or otherwise accomplishes the sale of each ordered or reordered part to (and the return of each specified part from) to the addressee computer's store.

In preferred embodiments, the order data generation software of the invention (e.g., software which programs computer 2 of FIG. 2), or the forecasting software of the invention (e.g., software 43 which programs computer 50 of FIG. 3) which supplies forecast data to order data generation software (e.g., software 44 of FIG. 3), implements one of the forecasting methods described in the following paragraphs.

One such preferred forecasting method is a point-of-sale (POS) based method. This method determines a forecast of sales of a part by a particular store (denoted as "store A" for convenience) in a particular time period (whose duration is denoted as "time P" for convenience) in accordance with equation (1):

$$F = W \times D \times T \tag{1}$$

where F is the forecasted number of sales of the part (in time P) by store A,

W is a weighted average of relative store sales of the part (by a population of stores which stock or sell the part, which may but need not include store A), T is a trend factor for the part. The trend factor T is typically determined (in a manner that will be apparent to those of ordinary skill in the art) from data indicative of the sales experience of the population of stores which stock or sell the part (which may but need not include store A), or of the sales experience of manufacturers or vendors at a higher level of distribution of the part, and D is the total demand potential (for store A) of all parts in the same user-defined category as the part. The total demand potential D is the actual number of sales by store A of all parts (in the same user-defined category as the part) stocked by store A (in a recent time period of duration P), adjusted to include estimated sales activity for parts not stocked by store A.

For convenience, the expression "parts similar to" a part herein denotes the set of all parts in the same user-defined category as the part.

The weighted average W of relative store sales of the part is $(W_1 R_1/S_1 + W_2 R_2/S_2 + \ldots + W_i R_i/S_i) / i$, where $R_j$ is amount of sales of the part by the "j"th store in the population, $S_j$ is amount of sales of all parts in the same category as the part (all parts "similar to" the part) by the "j"th store in the population, and $W_j$ is a weighting factor for the "j"th store in the population. Alternatively, the weighted average may be computed by other methods, such as a weighted sum of sales of the part by the stores in the population $(W'_1 R_1 + W'_2 R_2 + \ldots + W'_i R_i$, where $R_j$ is amount of sales of the part by the "j"th store in the population, and $W_j$ is a weighting factor for the "j"th store in the population) divided by a weighted sum of the sales of all parts in the same category as the part by the stores $(W''_1 S_1 + W''_2 S_2 + \ldots + W''_i S_i$, where $S_j$ is amount of sales of all parts in the same category as the part by the "j"th store in the population, and $W''_j$ is a weighting factor for the "j"th store in the population). In each weighted average, there is one term for each of the stores in the population of "i" stores. Each weighting factor $W_j$ is determined by measures of similarity (to store A) based on sales activity, market information, inventory information, and/or customer demographics (such as vehicle population) regarding each store in the population. Similarity between store A and each store in the population is determined by one or more of the following factors: geographic proximity; statistical correlation of the sales of parts; common attributes of the customer base (or percent of sales to different categories of customers, such as wholesale and retail customers); and demographics of the stores' market areas Equation (1) can be a forecast for a part not actually stocked by store A.

A second preferred forecasting method is an actuarial method. This method is particularly suitable for forecasting sales of replaceable parts (in repairable systems). It will be described in a case in which it forecasts the sales of one type of motor vehicle part by a particular store (denoted as "store A") in a particular time period (denoted "time P"). Variations on the described case which forecast sales of other types of parts will be apparent to those of ordinary skill in the art.

In a class of preferred embodiments of the actuarial method, the forecast is determined in accordance with equation (2):

$$F' = \sum_{a=1}^{N} V_a \times R_a \times S, \qquad (2)$$

where F' is the forecasted number of sales of the part during time P by store A. $V_a$ is the vehicle population of age "a" fit by the part in the time period P of the forecast in store A's market area (an estimate of the number of vehicles of age "a" that use the part and that will be in store A's market area during time period P), $R_a$ is the failure rate per period P per vehicle of age "a" for the part (experienced by a population of stores that stock the part, possibly but not necessarily including store A), and S is an estimate of relative market share of store A in its market area (during time P). In equation (2), age index "a" is in the range from 1 unit to N units (where "unit" is typically one year but may alternatively be another unit of time) and N is the age of the oldest vehicle that can use the part that exists in period P.

The vehicle population V is an estimate of the number of vehicles (in store A's market area) which use the part. For many stores in the United States, this estimate can be obtained from a commercial database such as the Electronic Catalog Database maintained by Triad Systems Corporation of Livermore, Calif. (access to which is available from Triad Systems Corporation). The Electronic Catalog Database includes data relating motor vehicle parts to vehicles, which is combined with vehicle registry data identifying the number of vehicles of each type registered in each zip code (and thus can provide a vehicle population V estimate for those zip codes that determine store A's market area), to determine the number and age of vehicles fit for each part in the market area. Alternatively, the vehicle population estimate is derived from a specific list of current or prospective customers.

The failure rate R for a part, and the relative market share S of store A, can be determined by well known statistical techniques which analyze (in a well known manner) market data, and sales, inventory, and vehicle population data from a large sample of stores in a geographic region.

Alternatively, the forecasting software of the invention can implement both the method of equation (1) and the method of equation (2), and generate a weighted average of the forecast data F and F' produced by both methods The method of the invention includes the steps of providing reference data (indicative of two vendors at the same distribution level) to a computer, and operating the computer to execute software which generates order data in response to reference data. The programmed computer can be a host computer which receives the reference data from other computers, each operated by personnel of a different vendor (all the vendors being at the same distribution level). Or, the programmed computer can be operated by personnel of a first vendor, in which case some of the reference data is generated by that computer and the rest of the reference data is received from one or more other computers, each such other computer operated by personnel of a different vendor at the same distribution level as the first vendor. Preferably, the order data generation step includes the steps of generating forecast data from the reference data, and then generating the order data from the reference data. Preferably, the forecast data is generated by implementing a point-of-sale based forecasting method or an actuarial forecasting method, or by determining a weighted average of forecasts generated by both these forecasting methods.

We next provide more details regarding a preferred embodiment of the invention (in which a host computer is programmed with the forecasting software of the invention, each of two or more vendor computers is programmed with the order data generation software of the invention, and the host computer periodically (or at predetermined intervals) generates forecast data for processing by the order data generation software of the vendor computers.

In preferred implementations of this embodiment, the host computer will provide each of two or more vendors (at the same distribution level) with a periodic listing, by product line, of suggested inventory additions and deletions. The analysis will be based on sales history from a pool of vendor locations sharing similar climate, business mix, and warehouse/distributor affiliation (hence uniform product lines) and/or the local vehicle population, parts failure rate estimates and other warehouse/distributor and manufacturer information including consolidations, obsolescence, return schedules, and seasonal order schedules. The host computer preferably will periodically transmit a file of recommended inventory changes to each vendor computer.

The goal of the embodiment is to improve stocking decisions measurably. Each vendor (typically a jobber) whose vendor computer is connected with the host computer will see improved inventory turns due to a combination of reduced inventory and improved sales, and will likely also experience at least a slight reduction of expense and a slight improvement in gross profit resulting from reduced buyouts, fewer special orders and less non-movement return processing. Having the right parts in stock most of the time can also have significant long-term customer goodwill benefits for the vendor.

In the preferred embodiment, the host computer (when executing the inventive software) implements automated systems for: administration of service to the vendor computers, extraction of data from vendor computers (customer systems), merging of catalog and vehicle population data, and analysis production. In many applications, the host computer software will implement a relational database management system.

Five different information processing activities will be required to accomplish an effective service for the vendors: 1) Movement Consolidation, 2) Catalog and Vehicle Population Merge, 3) Coverage Overlap Analysis, 4) Demand Forecasting, and 5) Ranking and Stocking recommendations.

To accomplish Movement Consolidation, the host computer software will typically collect, collate, and store data via telecommunications. Differing line code conventions, part number formats, and base selling unit standards will necessitate conversion of source data into a standardized form. The administration of this activity, including scheduled telecommunication sessions and coordination of other aspects, such as, period-end cutoff and lost sales/buyout clearing schedules, will typically require considerable human interaction and computerized information on each vendor computer.

To accomplish Catalog and Vehicle Population Merge, six processes are typically performed: 1) Bridging, 2) Option Flagging, 3) Valid Options and Combinations Flagging, 4) Vehicle Population Filtering, 5) Applying Options "Build Rates", and 6) Calculating Part Number Vehicle Population.

Bridging requires the matching of the vehicle description nomenclature used in the data base consulted by the host computer with the nomenclature used in the vehicle population data. Vehicle population data will include census information. Because census information is dated (i.e., could be more than a year old), it may be desirable to add new model, year, sales statistics to the population data. This may be available from industry sources. This will be of primary use with filter and ignition products which begin replacement during the first year of vehicle operation.

Option Flagging: The data base consulted by the host computer typically contains vehicle description information beyond that contained in valid tables. This "detailed application" information is used by the data base program to ask questions (specific conditions) or to display text (comments, footnotes, headers) that further describes the vehicle to which a particular record pertains. Option flagging is the process of interpreting and converting this information, which is encoded in a variety of different forms, into a standardized form that can be used by the merge process.

Valid Options and Combinations Flagging: This processing of the data base (catalog) data further modifies the option flags by comparing the catalog records against the valid options for each application and also valid combinations of options. This can have a variety of consequences. For example, if the valid options and combinations database shows that a catalog record containing a certain engine code option flag came only with EFI (electronic fuel injection), the option flag for EFI would also be set. Another situation may actually eliminate a catalog record. For example, a record containing an option flag for a transmission that was not used the model year could be eliminated from further processing. This process not only cleans up the data but will also add to the options flags.

Vehicle Population Filtering is the first step in dealing with option flags to calculate vehicle count. The vehicle population data base often includes some specification of option flag criteria, such as, carburation and body type. This process uses such information to clarify any vehicle counts for records containing option flags relating to these factors.

Applying Options "Build Rates": An options build rate data base (consulted by the host computer) preferably contains information that describes how various vehicle options that are not handled through bridge filtering are distributed through the vehicle population. This final step in the merge process involves the application of this information to the catalog records which contain unresolved option flag criteria so that a final vehicle count can be determined. Options build rate information will typically come from a variety of sources. Some may be derived from original equipment manufacturer build rate statistics, while some may represent estimates. A good example of the later would be a record which fits vehicles with "dealer installed air conditioning." The actual mix is unknown, so subjective judgement will likely need to be applied to reconcile the actual count. This process will be additionally complicated by geographic variances.

Calculating Part Number Vehicle Population: This final step extracts the target trading area vehicle population from the vehicle population database using the build rate data applied during the Options Build Rate Filtering Step. There will be many situations when the merge process fails to produce a firm vehicle count for a given part number. This can occur in two cases: where detailed application information is not converted to an option flag (such information cannot be used until its converted); and where no method of filtering is provided, such as when there is no information entered into the build rate data base. In these situations the part number will probably have some catalog records with "clean counts." In effect there will be a minimum count (i.e., sum of the clean counts) as well as a maximum count (i.e., minimum count plus the total potential from unresolved counts). The actual count will be somewhere between the two numbers. Where there is ambiguity or multiple choices, the vehicle count is allocated across the choice of parts of the same description that may fit the vehicle.

Coverage Overlap Analysis: Coverage overlap, where a part is available from two or more product lines, is a frequent occurrence in the aftermarket. There are a number of very good reasons why this situation has evolved and will continue in the future. Our purpose is to give the jobber a tool that may help to prevent this from becoming a problem causing needless investment duplication. In the absence from a complete aftermarket interchange database, the best source of information regarding part number equivalency is the warehouse/distributor who typically needs this for order processing and perhaps purchasing. The first step in dealing with this problem is to find out how the warehouse/distributor handles it. If they omit overlap in their own system, overlap can be handled by merely processing only the part numbers that are included in the warehouse/distributor's active part number database. If overlap is tolerated and the warehouse/distributor has a reference database, then this information may be used to combine sales histories from equivalent part numbers and also to print comments explaining the equivalency in Classification Analysis reports (provided to the vendor computers) immediately following the host computer-generated recommendations. This will allow each vendor (typically a jobber) to make a conscious decision as to which part number to stock and avoid duplication. If an interchange or equivalency database is not available then the only other method of assisting the jobber would involve the processing of all product lines the jobber stocks to identify any equivalencies that may exist between any two lines (but this is not likely to be a viable method since the additional processing overhead would be considerable).

Demand Forecasting: In the embodiment being described, the host computer is programmed to generate demand estimates by part number for each vendor computer (customer location). Three categories of analysis capabilities are needed: 1) movement analysis, 2) vehicle population analysis, 3) movement with population analysis. Each type of analysis will produce estimates of the total market demand by part number in each trading area. Each location's target market share and objectives (GMROI, turns, etc.) will then be applied to generate customized listings showing recommended changes.

It will be desirably to test the modeling method implemented by the host computer by using historical data (e.g., previous year's vehicle population data catalog and sales history) against actual historical results obtained by performing the invention. The system of the invention should be capable of projecting what actually happened (at least to the parts stocked) in the past year from a picture of the facts as they existed at the beginning of the past year. If it can, it will be reasonable to expect that it will work in the year to come. This is an important test that should be built in from the start and carried on into the following years, at least until the host computer programming is perfected. It may even be useful to apply historical deviations from the model's projections as a means of adjusting for unknown factors.

Movement Analysis utilizes only sales history to create demand estimates. It will be needed where vehicle population data is not available or affordable. Movement analysis creates estimates of vendor demand based on sales by both the vendor and other vendors in its region. Today, jobbers use a variety of methods to determine what should or should not be stocked, including: 1) order point calculation reports, 2) zero sales reports, 3) lost sales and buyout reporting, 4) warehouse/distributor sales rank coding, 5) manufacturer stock classification coding, 6) application descriptions provided in new number announcements and buyer's guides. Typically, jobbers tend to stock new items, particularly those for marginal popularity applications, only after they have recorded some activity. They also tend to retain items whenever they have had recent activity. Because this view is limited to only the one store's experience sub-optimal selections are often made resulting in unnecessary lost sales and wasteful investment.

Movement analysis resolves this deficiency by consolidating all jobber sales history for a product line within a region. This information is then used to develop an estimated regional demand. Each store's demand is in turn estimated based on the store's share of regional sales in the line. Jobbers should also be allowed to optionally specify (to the host computer) sales increases or decreases based on their expected gain or loss of market share.

Auto part stores serve many different types of markets. The mix of part numbers in a rural store can be very different from an inner city location. In order to deal with these and other differences, it will be necessary to first identify part numbers that apply primarily to specific types of use. Fortunately, most manufacturers have already provided this information as part of their part number popularity code system. Typically, codes distinguish between agricultural, industrial, heavy truck (often called "heavy duty"), marine and high performance parts.

Movement analysis will utilize market coding to subdivide product lines allowing demand estimates to reflect the store's true market mix within each product line. For example, a store selling more agricultural items will have a larger and proportional share of regional demand of the agricultural items within the product line. This will make it possible for movement analysis to yield classifications that reflect the unique market focus of each location.

It is desirable for the host computer to retain data characterizing four or even more years of regional history so that better trends may be developed.

Vehicle Population Analysis: Population analysis utilizes part data from a data base merged with vehicle population data without any movement history to create demand estimates. This type of analysis is needed if there is no history available from other stores in the region. New locations, unaffiliated jobbers (no regional movement database available) and jobbers not wishing to share their history (by providing relevant data to the host computer) are some of the situations where this analysis will be required. This analysis provides no guidance for non-application part numbers or part numbers for vehicles not in the vehicle population database.

Both expected market share of each location and failure rate (replacement interval) estimates are very important components in this analysis. Without them demand cannot be predicted.

Estimates with vehicle population analysis (only) would be done as follows. Vehicle population by part number is computed for the trading area specified for the vendor, summarized by model year. The host computer estimates the failure/replacement rate by age of vehicle for the part type, based on industry knowledge of manufacturer recommendations. The host computer then multiplies this by current vehicle population to estimate current demand for the trading area. To estimate next year's demand, the host computer "ages" the vehicle population by one year, optionally adjusting counts based on trends in vehicle population, then multiply by replacement rate.

To estimate sales in the store the host computer factors the trading area demand by the market share of the store. The easiest way to do this is to take the total unit sales for this store versus the estimated trading area demand total for all parts in the line included in the vehicle population analysis.

Market share data will not be consistent across all product lines and may be effected by jobber actions or external events such as failure of a major competitor or entry of a new competitor. Ultimately the jobber will need to predict a market share target for each product line.

Failure rates will be estimated using reference data from part vendors and vehicle population data using well known statistical methods to determine (or estimate) failure or replacement rates by part number or for all parts of the same description or all parts fitting a make or class of vehicles. Failure rate estimates by part type will preferably be expressed in a variety of ways. They may vary by location and/or vehicle make. Batteries would be a good example of such a situation. In Chicago three to four years is a very typical life for batteries, while in San Francisco five to six years is more typical. Other failure rates will apply to just certain part descriptions. They may also depend on differing locations and/or vehicle makes. Oil filters have a rather uniform life regardless of climate or vehicle make. Still other failure rates may apply to very specific applications. Due to differing engineering standards, some vehicles may wear out certain parts at a much different rate from the norm. Certain cars, for example, are known for rather frequent brake pad and rotor replacement, and other models of cars tend to have very long engine life relative to most vehicles. Geography also can significantly contribute to variations in failure rates. Mountain driving is hard on brake friction surfaces. City conditions are usually harder on exhaust and some other parts.

Movement with Vehicle Population Analysis: This "combined" analysis is for when both movement history by part number and vehicle population data are available for parts in the catalog consulted by the host computer software. Properly utilized, this wealth of information can produce the best estimated demand. Although a part number may be in the catalog and it may also be for a vehicle in the vehicle population data, it is entirely possible that much of the movement of a part number comes from other applications. There are also many part numbers that may either not be included in the catalog data base or may be for vehicles not covered by the vehicle population data base (special fleet, farm and industrial vehicles, new model year cars and light trucks, older and specialty vehicles, heavy duty vehicles, etc). Movement information thus offers some very important additional insight. Vehicle population and failure rate estimates, on the other hand, may be used to anticipate changes in demand not revealed by movement history alone.

The "combined" analysis will work as follows. Using knowledge of part types and typical patterns of replacement and aftermarket sales, the host computer will create mathematical models of part demand. Models will be tested statistically, selecting the best one for each part type. Regional estimates of sales per vehicle fit, depending on vehicle age and other factors, will be made through statistical analysis. This estimate will be applied to the stores trading area to create a demand estimate for each part, factored by the fractions of product line sales and total vehicles versus the region.

Ranking and Stocking Recommendations: The first level of analysis is to clean-up the inventory, assuming that the jobber's line selection and market position will not change in the coming year. Some jobbers are more analytical while others exhibit a "seat of the pants" style. The preferred host computer software is flexible enough to accommodate these varied conditions and perspectives. The stocking recommendations must not contradict "common sense".

Inventory stocking needs inevitably reflect each jobber's goals relative to their unique competitive and financial conditions. Each product line analysis will allow the jobber to specify their goals and limits on investment. GMROI or turns as well as anticipated changes in their market share. Host computer-generated recommendations are preferably adjusted to take into consideration carrying, selling, returning, and receiving expenses.

Estimated Available Market Share: The host computer is preferably programmed to estimate a jobber's market share for the line, given the jobber's sales history. Normally share is assumed to be constant for the next year. If a change in share is planned, the jobber (i.e., its vendor computer) must specify to the host computer the change in market share by product line. This does not mean that the jobber will achieve this level since one of their goals, such as investment level or minimum GMROI, may prevent it from reaching the level. It is a maximum level which the jobber feels is available given all other considerations.

Ranking (GMROI vs. Turns): The host computer preferably ranks parts based upon the forecast demand for a store—using either "turns" or GMROI computed with minimum stock and forecast sales.

Jobbers have historically thought in terms of inventory turns. As a result, a "turns" point of reference has evolved in the "minds" of many jobbers which they use in viewing their inventory investment:

$$\text{Inventory Turns} = \frac{\$ \text{ Annual Cost of Goods Sold}}{\$ \text{ Average Investment}}$$

Some jobbers have also started to focus on gross margin return on investment (GMROI), which should be available as an option:

$$GMROI = \frac{\$ \text{ Annual Gross Profit}}{\$ \text{ Average Investment}}$$

One difficulty in programming the host computer to deal with GMROI is determining the selling price. Two methods will typify the pricing strategies that jobbers use. The first, mark-up from jobber cost (could also be expressed as GP %), assumes uniform profit margins, which makes GMROI give identical rankings to "turns". Most manufacturers suggest uniform margins in their price sheets. Expressing selling prices as a percentage (i.e., mark-up or mark-down) of dealer net allows for variable margins that may exist in the manufacturers suggested pricing structure. When the jobber uses complicated variable pricing strategies within a line it is impractical to attempt to mirror this in our analysis.

The jobber is preferably able to select either inventory turns or GMROI ranking (by causing corresponding selection data to be sent to the host computer). Host computer-generated recommended changes will be listed in descending order from highest to lowest rank. Regardless of ranking method selected, both GMROI and turns will be printed for each product line.

Jobber Stocking Goals: The jobber should be able to target the analysis on one of the following goals:

1) % Change in Investment Level;
2) Average Turns (or GMROI); or
3) Minimum Acceptable Turns (or GMROI) for a part.

Selections should accept either a percentage change or no limit. For example:

| Goal | Entry |
| --- | --- |
| No change in inventory | = 0% |
| Add 25% to GMROI | + 25% |
| No limit | (blank entry) |

Expense Adjusted Recommendations: Jobbers seldom have an accounting system that routinely reports handling, carrying or direct selling expenses down to the line item level. Nonetheless, these factors are material to the purpose of programming the host computer to make only the most profitable recommendations. The host should be programmed to assume typical industry factors in making these calculations (unless it is determined to be appropriate to allow for individual jobber input).

There are at least four expenses that could impact the profitability of removing and adding parts:

1) Deleting Part Numbers: The cost of picking, packing and shipping, waiting for credit from the supplier, bookkeeping, removing from computer, etc.;
2) Adding Part Numbers: Entry into computer, shipping, unpacking, check-in, reporting short shipments, put-up, shelf shifting, and other processing such as bookkeeping;
3) Inventory Carrying Cost: In a classic "text book" situation carrying cost would include all costs associated with carrying an item (i.e., shelf space, utilities, etc.).

However, since may of these expenses are fixed in the near term our focus will be primarily limited to expenses such as the cost of money associated with the required investment; and 4) Selling: Although there is some variation in selling expense, such as the cost of invoicing, picking or even catalog look-up, it is generally a consistent dollar value from line item to line item.

For example, exhaust parts tend to have higher handling and carrying and selling expenses per item.

Related Parts Recommendations: Certain parts consistently require related items. Just of few of many examples include:

Wheel bearings and wheel seals

Distributor cap and rotor

Many parts requiring gaskets and the corresponding gaskets

Certain starters require a solenoid some % of the time

A new battery requires new battery cables some % of the time

When a part nearly always requires another part, it makes little sense to stock it without also stocking the other part. Since related items are often in different product lines, it will be sufficient, at least initially, to merely print a related item message following stocking recommendations. A more advanced feature would include the related item part number in the message and also take the related item investment into consideration.

Selling Quantity and Minimum Purchasing Quantity:

For this analysis, the host computer preferably is programmed to use the larger of "selling quantity" and "minimum purchasing quantity" ("standard pack") as the quantity to stock.

"Selling Quantity" is similar but not identical to "per car" quantity. Per car quantity is application specific. The same part number may have different per car quantities depending on the vehicle. Some spark plug part numbers for example, fit 4, 6 and 8 cylinder engines. Another situation that is actually more common are part types that are usually not sold in per car quantities. Wheel, axle, most engine, brake and chassis parts fall into this category. And even within certain part types there are exceptions. Many mechanics, for example, refuse to change only one front brake rotor on some late model, particularly imported, vehicles. Selling quantity is part number specific and represents the predominant multiple it is sold by. Stocking recommendations should be evaluated and expressed in selling quantity multiples.

Minimum Purchase Quantity: Many part numbers come in minimum quantity packages. When the purchase quantity is greater than the selling quantity or the purchasing quantity is not evenly divisible by the selling quantity, the extra inventory investment required to stock the item should be considered in making the recommendation to stock the item. For example, an item with three annual sales and a selling quantity of one that must be purchased 10 at a time will only have an average first year inventory turn of 0.35. The same situation for a part that can be purchased one at a time will have a turn of 3. It is also important to note that some warehouse/distributors will not accept returns of less than minimum purchase quantity (exceptions are sometimes made for obsolete items).

The following considerations pertain to the format of the reports provided by the host computer to each vendor computer:

Summary Pages: Each report preferably includes an introductory summary page showing the estimated effects of recommended changes, with a page for each product line and one for the total of all product lines analyzed. The summary also preferably includes any assumptions which were followed in preparing the report (description of trading area, etc.) as well as vendor information such as name, address, etc.

Product Line Recommendations: The standard report will list only recommended changes. The same format should be used for all three types of analysis (i.e., 1) movement, 2) vehicle population and 3) movement and vehicle population). Vehicle population and trading area information is presented only when applicable. "Estimated Demand" is preferably the only expression of part number activity presented in the reports. Details such as vehicle populations by part number, average age of vehicles by part number and even sales histories are preferably excluded so that only the most relevant decision making information (i.e.: demand) is the focus.

Both GMROI and "turns" recommendations are included. If the report is run by the GMROI ranking option then GMROI is the first column and turns the second. If the option is turns the opposite is true.

Product lines are treated separately. A product line summary is shown at the beginning of each product line. Additions and deletions are segregated. Part numbers are listed from highest to lowest rank with subtotals for recommended additions and deletions and net change totals by product line. Part number equivalency and supersession comments, such as a reference to an equivalent part number in another line, and suggested related items are inserted where appropriate.

Detail Reports: optional detailed report formats showing all part numbers, more history or population data and/or with price sheet sequencing are preferably also available to each vendor computer.

Platform security considerations: In implementing the preferred embodiment, it should be assumed that jobbers will be concerned about sharing their inventory profiles with competitors. Jobbers will justifiably view what they stock as a very important secret. Thus, the invention will preferably be implemented in a manner so that the security of vendor-provided data security is maintained (or optionally so that any exposure associated with provision of data to the host computer is more than offset by the benefits of the host computer-generated reports).

Preferably the host computer is programmed so as not to disseminate vehicle population and classification data. This is one of the advantages of producing a localized analysis that only reveals new items to add and old items to drop. Provision of complete listings to all vendor computers could reveal too much detail.

Telecommunications is the preferred way to gather (at the host computer) the necessary sales history and inventory data from the various vendor computers. Telecommunications is also preferred for distribution of classification reports and file changes from the host computer to each vendor computer. However, deficiencies in the report spooling capabilities on the vendor computers and various other complexities associated with transmitting reports to the vendor computers will typically require that paper reports distributed via mail also be supported.

Telecommunications may also be used to receive (at the host computer) various types of information from warehouse/distributors and manufacturers. This may include data indicative of part equivalence (substitution number, supersessions alternate number, and the like), obsolescence, market type codes (agricultural, heavy truck, etc.), and schedules for clean-ups and change-overs. Vehicle census data will normally be input to the host computer via magnetic media.

User Interface Requirements: The preferred embodiment implements three user interfaces:

1. Host computer administration and support: This operation requires manual entry of information by host computer support/marketing personnel, including various types of customer information used to collect data, to process the data, and finally to bill for the service. Fast access to data and ease of use are important in this area;

2. Host computer research and analysis processing: This activity will be administered by technical specialists. Batch processing, although not required, may be utilized. Automatic scheduled processing will be required for data collection (e.g., from the vendor computers). Ease of use is not critical in this area; and 3. Reports to Vendor Computers: Reports generated by the host computer should be easily understandable by the vendors. They must be decision-oriented documents containing compelling justification for the host-recommended changes.

The data bases consulted by (and typically stored in) the host computer in implementing the preferred embodiment include:

1. a customer (vendor) data base, including data of the following type:

| Data Title | Description |
| --- | --- |
| Customer info. | Customer number, name, address, phone, etc. |
| Set-up: | Telecom phone, Year End Schedule, Lost Sales and Buyout Clearing Schedule, Nation Account affiliation |
| Product Lines: | MCL tables to translate user line codes to host line code |
| Market Description: | Market share, sales mix by market type, trading area geographic definition for each vendor |
| Inventory data: | Part numbers, sales, buyout and lost sales |
| Operating parameters: | Inventory goals, average days supply, pricing, minimum GMROI/turns, etc. |

2. a parts manufacturer data base, including data of the following type:

| Data Title | Description |
| --- | --- |
| Supersessions: | typically provided by warehouse/distributors |
| Popularity codes: | Obsolescence status and popularity |
| Market type codes: | Heavy duty, agricultural, marine, etc. |
| Failure rates: | Expected part life |
| Related items: | Other items that the job requires |

3. a vehicle manufacturer data base, including:

| Data Title | Description |
| --- | --- |
| Valid options and combinations | What option combinations are valid, option dependencies, and option linkage |
| Option build rates | How many built with each option |

4. a warehouse/distributor ("WD") distribution group data base, including:

| Data Title | Description |
| --- | --- |
| Approved customers: | What jobbers belong |
| Equivalency information: | Valid part numbers and/or equivalent part number info |
| Schedules: | Line clean-up (return & restocking), change-overs and seasonal |
| WD stoaked items: | Active part numbers and sales history |
| Minimum quantity: | Minimum quantity that may be purahased and/or returned |

5. a part numbers and pricing data base, including:

| Data Title | Description |
| --- | --- |
| Selling unit algorithm: | How to distinguish between each and package quantities |
| Part number format | Compress out extra/special characters and determine standardized part number |
| Line code profile: | Convert the user's line codes to host standard codes. |

6. a population data base, including:

| Data Title | Description |
| --- | --- |
| Vehicle description tables: | How the vehicles are described in the data base |
| Vehicle census data: | Vehicle registration records |
| Vehicle sales information: | New model year sales for use in filter and ignition coverage during the first year |
| Trading area parameters: | How the trading areas can be described |

Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics include sales characteristics, inventory characteristics, and market characteristics, wherein the first computer is a host computers;

a second computer, connected for communication with the first computer, and programmed with software for supplying a first portion of the reference data to the first computer, said first portion consisting of data indicative of characteristics of the second vendor, where said characteristics of the second vendor include sales characteristics of the second vendor, inventory characteristics of the second vendor, and market characteristics pertaining to the second vendor; and a third computer, connected for communication with the host computer, and programmed with software for supplying a second portion of the reference data to the host computer, said second portion consisting of data indicative of characteristics of the first vendor, where said characteristics of the first vendor consist of at least one member of the set consisting of sales characteristics of the first vendor, inventory characteristics of the first vendor, market characteristics of the first vendor, and demographic characteristics pertaining to the first vendor.

2. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics include sales characteristics, inventory characteristics, and market characteristics, wherein the first computer is a first vendor computer; and a second computer, connected for communication with the first computer, and programmed with software for supplying a first portion of the reference data to the first computer said first portion consisting of data indicative of characteristics of the second vendor, where said characteristics of the second vendor include sales characteristics of the second vendor, inventory characteristics of the second vendor, and market characteristics pertaining to the second vendor, wherein the second computer is a second vendor computer, and the first computer is also programmed with software for generating a second portion of the reference data, said second portion consisting of data indicative of characteristics of the first vendor, where said characteristics of the first vendor consist of at least one member of the set consisting of sales characteristics of the first vendor, inventory characteristics of the first vendor, and market characteristics of the first vendor.

3. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics include sales characteristics, inventory characteristics, and market characteristics; and a second computer, connected for communication with the first computer, and programmed with software for supplying a first portion of the reference data co the first computer, said first portion consisting to data indicative of characteristics of the second vendor, where said characteristics of the second vendor include sales characteristics of the second vendor, inventory characteristics of the second vendor, and market characteristics pertaining to the second vendor, wherein the reference data indicative of market characteristics includes data indicative of vehicle population by age fit by part, data indicative of part failure rate per vehicle by age during a selected time period, and data indicative of an estimate of relative market share of said at least one of the vendors during the selected time period.

4. The system of claim 1, wherein the order data is indicative of a recommended inventory increase transaction.

5. The system of claim 1, wherein the order data is indicative of a recommended inventory decrease transaction.

6. The system of claim 1, wherein the order data is indicative of a recommended stocking level of parts by at least one of the first vendor and the second vendor.

7. The system of claim 1, wherein the order data generation software includes:

forecast data generation software for generating forecast data by processing the reference data; and software for processing the forecast data to generate the order data.

8. The system of claim 7, where the forecast data generation software generates the forecast data by implementing a point-of-sale based method, where the forecast data includes data indicative of a forecasted number of sales of a part in a first time period by the first vendor, where the forecasted number of sales of said part is F, where $F = W \times D \times T$, where W is a weighted average of relative store sales of the part by a population of vendors which stock the part, T is a trend factor for the part, and D is a total demand potential for the first vendor of all parts similar to the part.

9. The system of claim 8, wherein the total demand potential, D, is indicative of actual number of sales by the first vendor of all parts similar to the part stocked by said first vendor in a second time period having duration substantially equal to that of the first time period, adjusted to include estimated sales activity for parts similar to the part that are not stocked by said first vendor.

10. The system of claim 7, where the forecast data generation software generates the forecast data by implementing an actuarial method.

11. The system of claim 10, where the forecast data are indicative of a forecasted number of sales of a part in a first time period by the first vendor, and the forecasted data are determined by processing data indicative of vehicle population by age fit by the part in the first vendor's market area, data indicative of failure rate for the part per vehicle by age during the first time period, and data indicative of an estimate of the first vendor's relative market share in the first vendor's market area during said first time period.

12. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics consist of at least one member of the set consisting of sales characteristics, inventory characteristics, demographic characteristics, and market characteristics; and a second computer, connected for communication with the first computer, and programmed with software for supplying a first portion of the reference data to the first computer, said first portion consisting of data indicative of characteristics of the second vendor, where said characteristics of the second vendor consist of at least one member of the set consisting of sales characteristics of the second vendor, inventory characteristics of the second vendor, market characteristics of the second vendor, and demographic characteristics pertaining to the second vendor, wherein the order data generation software includes:

forecast data generation software for generating forecast data by processing the reference data; and software for processing the forecast data to generate the order data, where the forecast data generation software generates the forecast data by implementing a point-of-sale based method, where the forecast data includes data indicative of a forecasted number of sales of a part in a first time period by the first vendor, where the forecasted number of sales of said part is F, where $F=W \times D \times T$, where W is a weighted average of relative store sales of the part by a population of vendors which stock the part, T is a trend factor for the part, and D is a total demand potential for the first vendor of all parts similar to the part, wherein the population consists of a number, i, of vendors, and wherein the weighted average, W, satisfies $W=(W_1 R_1/S_1 + W_2 R_2/S_2 + \ldots + W_i R_i/S_i)/i$, where $R_j$ is an amount of sales of the part by the "j"th vendor in the population, j is a number in the range from 1 through i, $S_j$ is an amount of sales of all parts similar to the part by the "j"th vendor in the population, and $W_j$ is a weighting factor for the "j"th vendor in the population.

13. The system of claim 11, wherein each said weighting factor $W_j$ is a measure of similarity of the "j"th vendor and the first vendor, based on statistical analysis of characteristics of said "j"th vendor and said first vendor.

14. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics consist of at least one member of the set consisting of sales characteristics, inventory characteristics, demographic characteristics, and market characteristics; and a second computer, connected for communication with the first computer, and programmed with software for supplying a first portion of the reference data to the first computer, said first portion consisting of data indicative of characteristics of the second vendor, where said characteristics of the second vendor consist of at least one member of the set consisting of sales characteristics of the second vendor, inventory characteristics of the second vendor, market characteristics of the second vendor, and demographic characteristics pertaining to the second vendor, wherein the order data generation software includes:

forecast data generation software for generating forecast data by processing the reference data; and software for processing the forecast data to generate the order data, where the forecast data generation software generates the forecast data by implementing a point-of-sale based method, where the forecast data includes data indicative of a forecasted number of sales of a part in a first time period by the first vendor, where the forecasted number of sales of said part is F, where $F=W \times D \times T$, where W is a weighted average of relative store sales of the part by a population of vendors which stock the part, T is a trend factor for the part, and D is a total demand potential for the first vendor of all parts similar to the part, wherein the population consists of a number, i, of vendors, and wherein the weighted average, W, satisfies $W=(W'_1 R_1 + W'_2 R_2 + \ldots + W'_i R_i)/(W''_1 S_1 + W''_2 S_2 + \ldots + W''_i S_i)$ where $R_j$ is an amount of sales of the part by the "j"th vendor in the population, $S_j$ is an amount of sales of all parts similar to the part by the "j"th vendor in the population, $W'_j$ is a weighting factor for the "j"th vendor in the population, and $W''_j$ is another weighting factor for the "j"th vendor in the population.

15. The system of claim 14, wherein each said weighting factor $W_j$ is a measure of similarity of the "j"th vendor and the first vendor, based on statistical analysis of characteristics of said "j"th vendor and said first vendor.

16. A computer system for controlling inventory of vendors at a single part distribution level, said vendors including at least a first vendor and a second vendor, said computer system including:

a first computer programmed with order data generation software for generating order data in response to reference data, where the reference data is indicative of characteristics of at least two of the vendors, where the characteristics consist of at least one member of the set consisting of sales characteristics, inventory characteristics, demographic characteristics, and market characteristics; and a second computer, connected for communication with the first computer, and programmed with software for supplying a first portion of the reference data to the first computer, said first portion consisting of data indicative of characteristics of the second vendor, where said characteristics of the second vendor consist of at least one member of the set consisting of sales characteristics of the second vendor, inventory characteristics of the second vendor, market characteristics of the second vendor, and demographic characteristics pertaining to the second vendor, wherein the order data generation software includes:

forecast data generation software for generating forecast data by processing the reference data; and software for processing the forecast data to generate the order data, where the forecast data generation software generates the forecast data by implementing an actuarial method, and wherein the forecast data include data indicative of a forecasted number of sales of a part in a first time period by the first vendor, where the forecasted number of sales of said part is F, where $$F = \sum_{a=1}^{N} V_a \times R_a \times S,$$

where "a" is vehicle age expressed as an integral number from 1 to N of time units, N represents age of the oldest vehicle that can use the part, $V_a$ is vehicle population of age "aa" fit by the part in the first vendor's market area during the first time period, $R_a$ is a failure rate for the part per vehicle of age "a" during the first time period, and S is an estimate of the first vendor's relative market share in the first vendor's market area during said first time period.

17. A method for controlling inventory of vendors at a single part distribution level, said vendors including at, least a first vendor and a second vendor, said method including the steps of:

(a) operating a first computer so as to generate order data in response to reference data, where the reference data is indicative of characteristics of at least two of the vendors, where the characteristics include sales characteristics, inventory characteristics, and market characteristics, wherein the first computer is a host computer;

(b) before step (a), supplying a first portion of the reference data to the first computer from a second computer, said first portion consisting of data indicative of characteristics of the second vendor, where said characteristics of the second vendor include sales characteristics of the second vendor, inventory characteristics of the second vendor, and market characteristics pertaining to the second vendor, and (c) before step (a), supplying a second portion of the reference data from a third computer to the host computer, said second portion consisting of data indicative of characteristics of the first vendor, where said characteristics of the first vendor consist of at least one member of the set consisting of sales characteristics of the first vendor inventory characteristics of the first vendor, market characteristics of the first vendor, and demographic characteristics pertaining to the first vendor.

18. A method for controlling inventory of vendors at a single part distribution level, said vendors including at least a first vendor and a second vendor, said method including the steps of:

(a) operating a first computer so as to generate order data in response to reference data, where the reference data is indicative of characteristics of at least two of the vendors, where the characteristics include sales characteristics, inventory characteristics, and market characteristics, wherein the first computer is a first vendor computers;

(b) before step (a), supplying a first portion of the reference data to the first computer from a second computer, said first portion consisting of data indicative of characteristics of the second vendor, where said characteristics of the second vendor include sales characteristics of the second vendor, inventory characteristics of the second vendor, and market characteristics pertaining to the second vendor, wherein the second computer is a second vendor computer; and (c) before step (a), operating the first computer to generate a second portion of the reference data, said second portion consisting of data indicative of characteristics of the first vendor, where said characteristics of the first vendor consist of at least one member of the set consisting of sales characteristics of the first vendor, inventory characteristics of the first vendor, market characteristics of the first vendor, and demographic characteristics pertaining to the first vendor.

19. A method for controlling inventory of vendors at a single part distribution level, said vendors including at least a first vendor and a second vendor, said method including the steps of:

(a) operating a first computer so as to generate order data in response to reference data, where the reference data is indicative of characteristics of at least two of the vendors, where the characteristics include sales characteristics, inventory characteristics, and market characteristics; and (b) before step (a), supplying a first portion of the reference data to the first computer from a second computer, said first portion consisting of data indicative of characteristics of the second vendor, where said characteristics of the second vendor include sales characteristics of the second vendor, inventory characteristics of the second vendor, and market characteristics pertaining to the second vendor, wherein the reference data indicative of market characteristics of each of said at least two of the vendors includes data indicative of vehicle population by age fit by part, data indicative of part failure rate per vehicle by age during a selected time period, and data indicative of an estimate of relative market share of said at least one of the vendors during the selected time period.

20. The method of claim 17, wherein the order data is indicative of a recommended inventory increase transaction.

21. The method of claim 17, wherein the order data is indicative of a recommended inventory decrease transaction.

22. The method of claim 17, wherein the order data is indicative of a recommended stocking level of parts by at lease one of the first vendor and the second vendor.

23. The method of claim 17, wherein step (a) includes the steps of:

(c) operating the first computer to generate forecast data by processing the reference data; and (d) after step (c), operating the first computer to process the forecast data to generate the order data.

24. The method of claim 23, wherein the forecast data includes data indicative of a forecasted number of sales of a part in a first time period by the first vendor, where the forecasted number of sales of said part is F, where F=W× D×T, where W is a weighted average of relative store sales of the part by a population of vendors which stock the part, D is a total demand potential for the first vendor of all parts similar to the part, and T is a trend factor for the part.

25. The method of claim 24, wherein the total demand potential, D, is indicative of actual number of sales by the first vendor of all parts similar to the part stocked by said first vendor in a second time period having duration substantially equal to that of the first time period, adjusted to include estimated sales activity for parts similar to the part that are not stocked by said first vendor.

26. The method of claim 23, wherein the forecast data are indicative of a forecasted number of sales of a part in a first time period by the first vendor, and the forecasted data are determined by processing data indicative of vehicle population by age fit by the part in the first vendor's market area, data indicative of failure rate for the part per vehicle by age during the first time period, and data indicative of an estimate of the first vendor's relative market share in the first vendor's market area during said first time period.

27. A method for controlling inventory of vendors at a single part distribution level, said vendors including at least a first vendor and a second vendor, said method including the steps of:

(a) operating a first computer so as to generate order data in response to reference data, where the reference data is indicative of characteristics of at least two of the vendors, where the characteristics consist of at least one member of the set consisting of sales characteristics, inventory characteristics, demographic characteristics, and market characteristics; and (b) before step (a), supplying a first portion of the reference data to the first computer from a second computer, said first portion consisting of data indicative of characteristics of the second vendor, where said characteristics of the second vendor consist of at least one member of the set consisting of sales characteristics of the second vendor, inventory characteristics of the second vendor, market characteristics of the second vendor, and demographic characteristics pertaining to the second vendor, wherein step (a) includes the steps of:

(c) operating the first computer to generate forecast data by processing the reference data; and (d) after step (c), operating the first computer to process the forecast data to generate the order data, wherein the forecast data includes data indicative of a forecasted number of sales of a part in a first time period by the first vendor, where the forecasted number of sales of said part is F, where F=W×D×T, where W is a weighted average of relative store sales of the part by a population of vendors which stock the part, D is a total demand potential for the first vendor of all parts similar to the part, and T is a trend factor for the part, wherein the population consists of a number, i, of vendors, and wherein the weighted average, W, satisfies $$W = (W_1 R_1 / S_1 + W_2 R_2 / S_2 + \ldots + W_i R_i / S_i) / i,$$

where $R_j$ is an amount of sales of the part by the "j"th vendor in the population, j is a number in the range from 1 through i, Si is an amount of sales of all parts by the "j"th vendor in the population, and W is a weighting factor for the "j"th vendor in the population.

28. The method of claim 27, wherein each said weighting factor $W_j$ is a measure of similarity of the "j"th vendor and the first vendor, based on statistical analysis of characteristics of said "j"th vendor and said first vendor.

29. A method for controlling inventory of vendors at a single part distribution level, said vendors including at least a first vendor and a second vendor, said method including the steps of:

(a) operating a first computer so as to generate order data in response to reference data, where the reference data is indicative of characteristics of at least two of the vendors, where the characteristics consist of at least one member of the set consisting of sales characteristics, inventory characteristics, demographic characteristics, and market characteristics; and (b) before step (a) supplying a first portion of the reference data to the first computer from a second computer, said first portion consisting of data indicative of characteristics of the second vendor, where said characteristics of the second vendor consist of at least one member of the set consisting of sales characteristics of the second vendor, inventory characteristics of the second vendor, market characteristics of the second vendor, and demographic characteristics pertaining to the second vendor, wherein step (a) includes the steps of:

(c) operating the first computer to generate forecast data by processing the reference data; and (d) after step (c), operating the first computer to process the forecast data to generate the order data, wherein the forecast data includes data indicative of a forecasted number of sales of a part in a first time period by the first vendor, where the forecasted number of sales of said part is F', where $$F' = \sum_{a=1}^{N} V_a \times R_a \times S,$$

where "a" is vehicle age expressed as an integral number from 1 to N of time units, N represents age of the oldest vehicle that can use the part, $V_a$ is vehicle population of age "a" fit by the part in the first vendor's market area during the first time period, $R_a$ is a failure rate for the part per vehicle of age "a" during the first time period, and S is an estimate of the first vendor's relative market share in the first vendor's market area during said first time period.

* * * * *